F. CLARK.
LAWN MOWER GRINDER.
APPLICATION FILED OCT. 26, 1915.
1,180,010.
Patented Apr. 18, 1916.
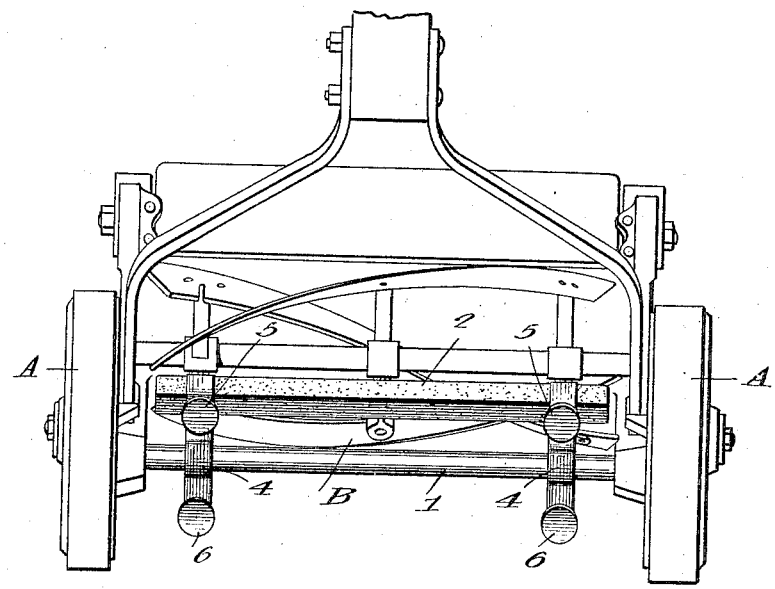
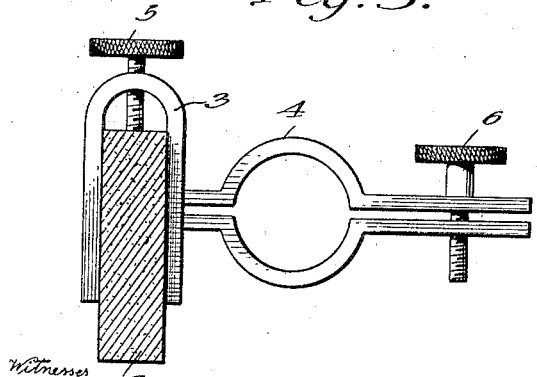
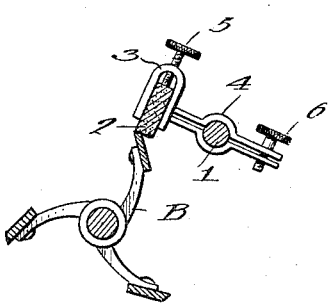
Witnesses
Fred C. Fabretti
Stephen E. Liesef
Inventor:
Frank Clark

UNITED STATES PATENT OFFICE.

FRANK CLARK, OF THROOP, PENNSYLVANIA.

LAWN-MOWER GRINDER.

1,180,010. Specification of Letters Patent. Patented Apr. 18, 1916.

Application filed October 26, 1915. Serial No. 58,055.

*To all whom it may concern:*

Be it known that I, FRANK CLARK, a citizen of Great Britain, residing at Throop, in the county of Lackawanna and the State of Pennsylvania, have invented a new and useful Improvement in Lawn-Mower Grinders, of which the following is a specification.

My invention relates to improvements in lawn mower grinders adapted to be attached to a type of lawn mowers in which a rotating reel operates in conjunction with a stationary cutter bar. The grinding elements are attached to the tie rod of the mower by a pair of arms and the stone is adjusted by a set-screw.

With these and other objects in view, the invention consists in the novel construction, arrangement and formation of parts as will be hereinafter specifically described, claimed and illustrated in the accompanying drawings, in which:

Figure 1 is a front view of the lawn mower with the grinder attached. Fig. 2 is a vertical section taken at right angles to the axle of the cutting reel of the mower. Fig. 3 is an end view of the grinding attachment.

In Fig. 1 is shown a lawn mower of ordinary construction, having ground engaging wheels "A" and the cutting reel "B". The ground wheels are braced by the usual tie rod 1. When it is desired to sharpen the reel of the mower, my invention, presently described, is attached to the tie rod.

The grinder consists of a grinding element which in the preferred form is a bar of rectangular cross section frictionally held between a pair of hubs. Each of these hubs is rigidly secured to a pair of arms. Each of these arms is bent to provide a semicircular ring to fit on the tie rod. Each pair of arms is provided with a set-screw to adjust the stone, and when the reels are ground the grinding elements can be easily removed; and when desired to have the reel sharpened, the grinder may be attached again.

1. is the tie rod of the mower.
2. is the grindstone.
3. is the hub where the stone fits in.
4. are the arms attached to the tie rod 1 on the mower.
5. is a set-screw to adjust stone and keep it in position.
6. is a set-screw to tighten the arms 4 on the tie rod 1.

I claim—

A grinder attachment for lawn mowers comprising a pair of clamps, having arms adapted to attach the same to the tie rod of the lawn mower, a set screw threaded through the arms and adapted to draw them together, said clamps comprising a U shaped member, an abrading bar mounted between the clamps and engaged between the arms of the U shaped member, and a set screw threaded in the bend of the U shaped member, abutting the bar and adapted to adjust the same to coöperate with the reel of the lawn mower.

FRANK CLARK.

Witnesses:
FRED C. FABRETTI,
STEPHEN E. KIESEL.

Copies of this patent may be obtained for five cents each, by addressing the "Commissioner of Patents, Washington, D. C."